Dec. 11, 1945.     H. TANNENBAUM     2,390,671
BABY CARRIAGE
Filed April 26, 1944     3 Sheets-Sheet 2
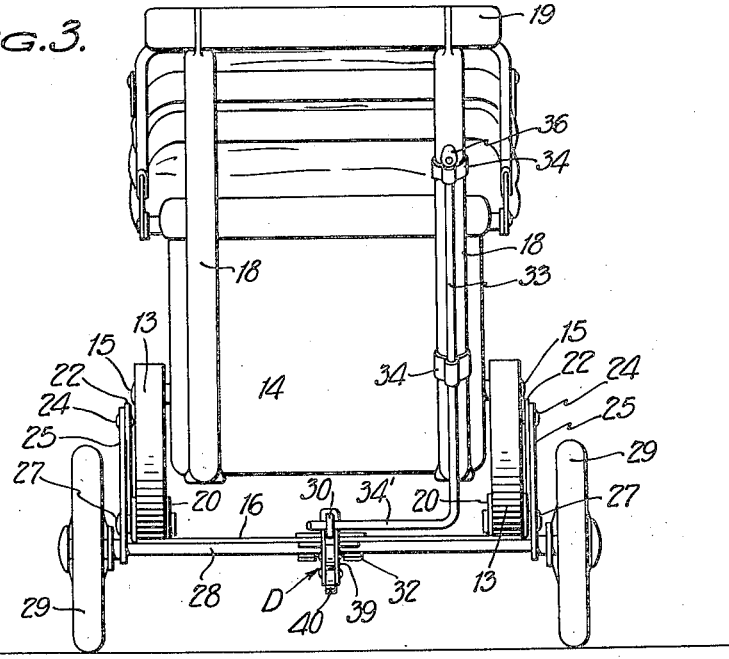
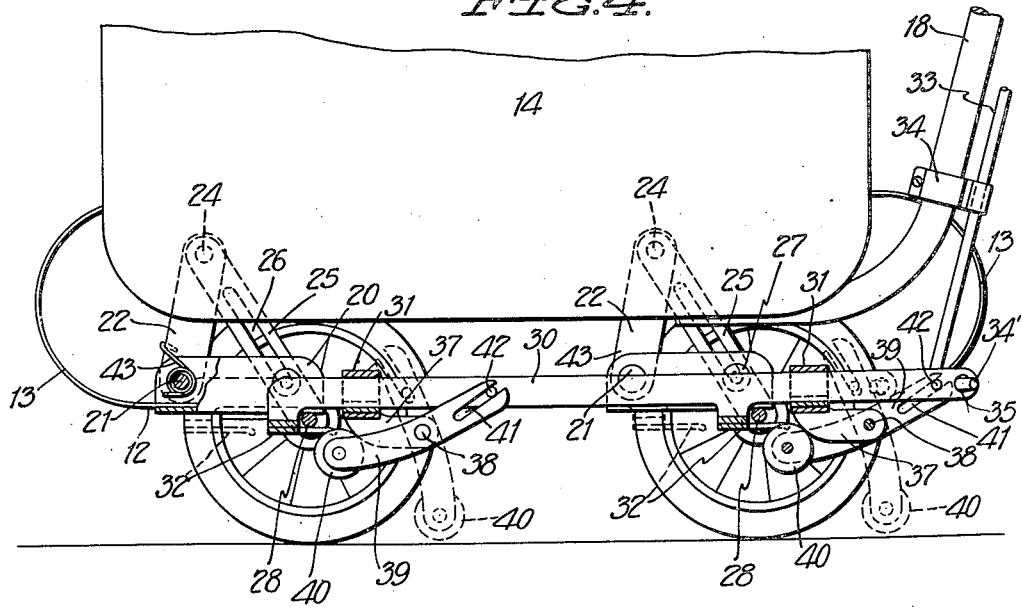
INVENTOR
HENRY TANNENBAUM
BY
ATTORNEYS Dec. 11, 1945.  H. TANNENBAUM  2,390,671
BABY CARRIAGE
Filed April 26, 1944  3 Sheets—Sheet 3
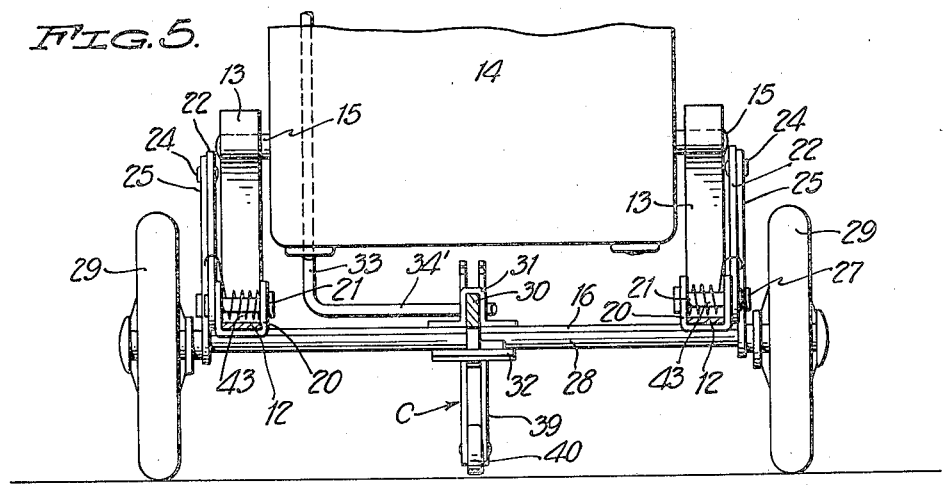
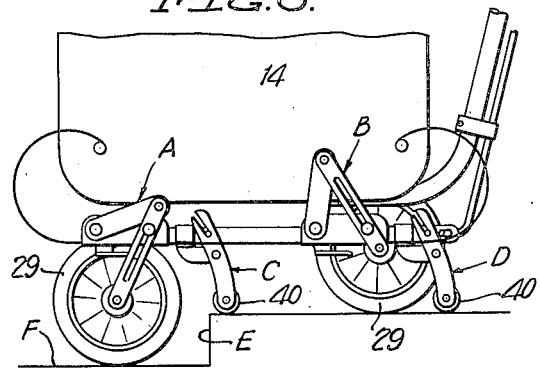
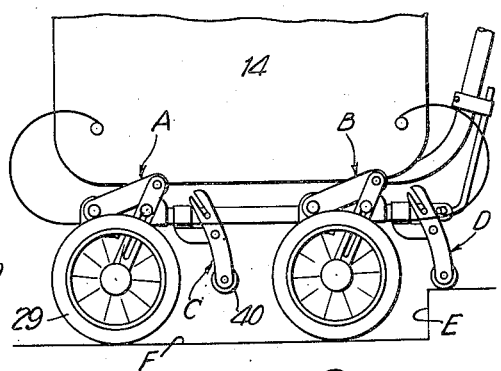
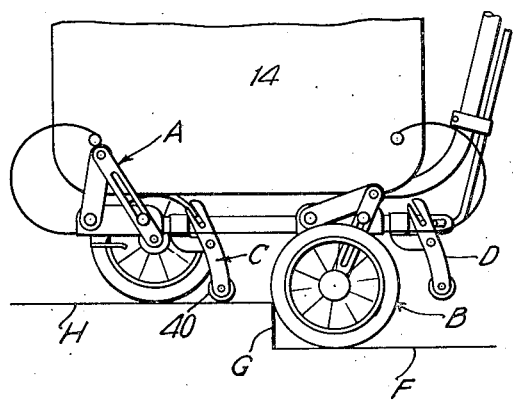
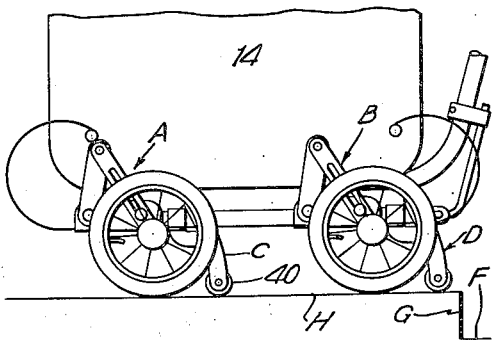
INVENTOR
HENRY TANNENBAUM
BY
ATTORNEYS Patented Dec. 11, 1945

2,390,671

UNITED STATES PATENT OFFICE 2,390,671

BABY CARRIAGE

Henry Tannenbaum, New York, N. Y.

Application April 26, 1944, Serial No. 532,765

6 Claims. (Cl. 280—43)

This invention relates to improvements in baby carriages and other wheel vehicles of the type which are propelled by manually pushing the same.

One of the important features of the invention resides in baby carriages which may be rolled from a sidewalk, down a curb, across a street, and up the curb onto the sidewalk at the opposite side of the street, while maintaining the body of the carriage on a horizontal plane at all times. By reason of the aforesaid feature, the strength and labor required for tilting the carriage upwardly while descending and ascending a curb or step is eliminated, as well as the danger of the baby falling from the carriage due to excessive and sudden tilting of the same.

Another feature of the invention is the provision of a baby carriage or like pushable wheel vehicle which has sets of front and rear wheels movable vertically from a raised position to a lowered position while descending a curb or step, and likewise movable from a lowered position to a raised position when subsequently ascending a curb or step, there being auxiliary wheels which function to support the body of the carriage during the period of down and up movements of the wheels to maintain the body in its normal horizontal position.

Another feature of the invention is to provide a novel manual operating means in reach of the pushing operator of a four-wheel vehicle by which the wheels may be locked in a raised position and released for facilitating their dropping to a lowered position, said operating means also acting to respectively move the auxiliary wheels to their operating position and to their non-operating retracted position.

Other novel features of the invention will become apparent as the following specification is read in conjunction with the accompanying drawings, in which, Figure 1 is a side elevational view of a baby carriage constructed in accordance with my invention, the front and rear wheels being illustrated in raised position.

Figure 3 is a rear elevational view.

Figure 4 is a fragmentary side elevational view partly in section.

Figure 5 is a vertical transverse sectional view taken on the line 5—5 of Figure 1, but showing the auxiliary wheels in lowered position.

Figures 6 to 9 are diagrammatic side elevational views of a baby carriage showing the positions of the wheels during the period of descending a curb, crossing a street, ascending a curb, and subsequently completing the ascent, respectively.

Figure 1:
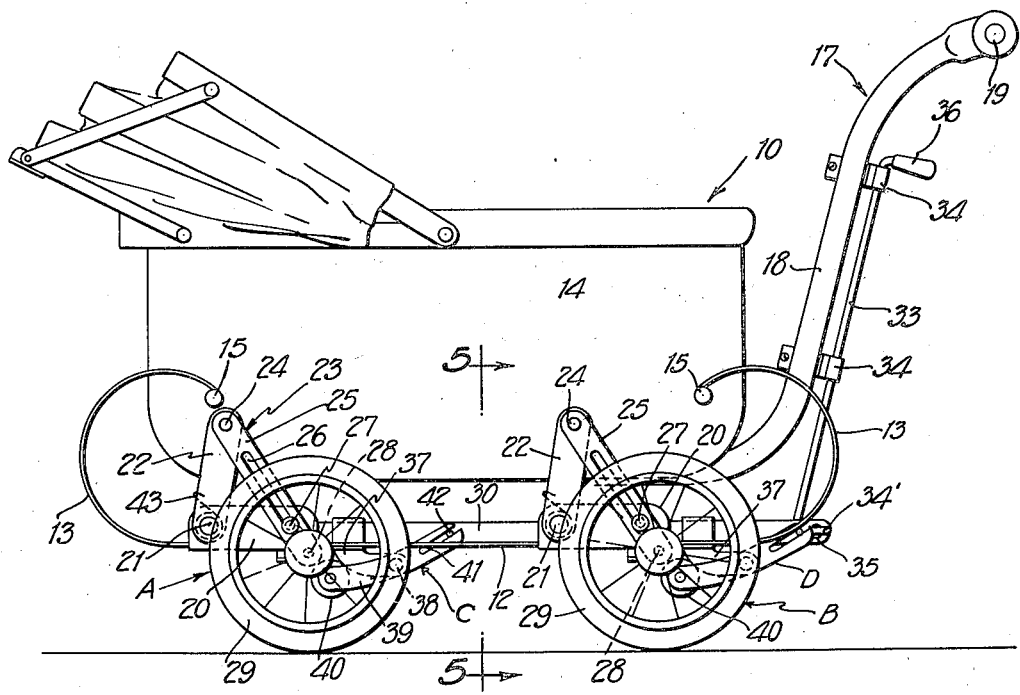
Figure 2:
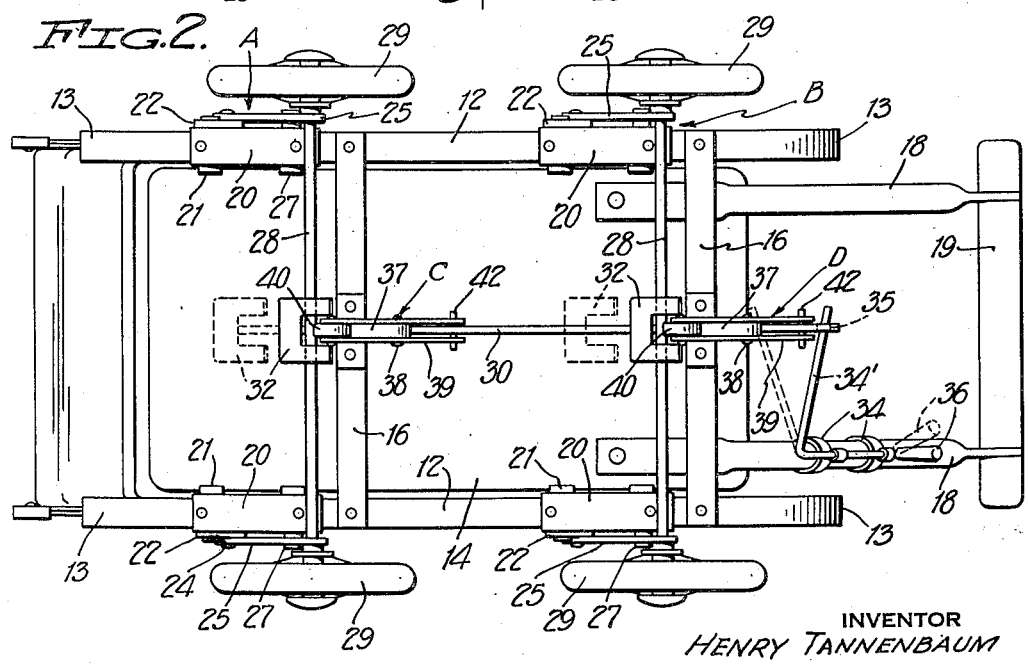
Figure 2 is a bottom plan view.

Referring to the drawings by reference characters, the numeral 10 designates a four-wheel vehicle in the form of a baby carriage constructed in accordance with my invention. The vehicle includes a chassis 11 comprising spaced longitudinal bars 12—12 having their ends looped upwardly as at 13—13 to form springs which are fastened to the sides of the body 14 as at 15. The chassis also includes transverse brace bars 16—16 which are fixed to the bars 12—12. Fixed to the body 14 and extending upwardly and rearwardly therefrom is a handle 17 comprising side rails 18—18 and a transverse hand grip bar 19.

Carried by the chassis 11 are vertically movable front and rear wheel units A and B. The wheel units A and B are identical in construction, therefore a description of one will suffice for the other.

Each wheel unit comprises opposed U-shaped brackets 20—20 fixed to the bars 12—12. Pivoted to each bracket 20 as at 21 is one end of a link 22 forming part of a toggle 23. The link 22 extends upwardly and rearwardly and has its free end pivoted as at 24 to a link 25. The link 25 is provided with an elongated slot 26 through which a fixed headed pin 27 extends. The pin 27 is fixed to the bracket 20 and extends outwardly therefrom. The lower end of the link 25 extends below the chassis 11 and the said ends of the opposed links 25 constitute hanger brackets for an axle 28. Wheels 29—29 are rotatably mounted on the ends of the axle 28. Under normal rolling of the vehicle, the wheel units A and B are normally in a raised or retracted position as best illustrated in Figures 1, 3 and 4, whereupon the weight of the body and chassis rests upon the axles 28. However, when the wheel units A and B are in their lowered or extended position the weight of the chassis and body is carried by the toggles 23 as best illustrated in Figure 7.

When the wheel units A and B are in their normal retracted or raised position, the same are locked against up and down movement by locking the axles 28—28 thereof to the chassis 11 by a novel manually actuated locking mechanism now to be explained.

The aforementioned manually actuated locking mechanism comprises a horizontal bar 30 which is slidably mounted in alined bearings 31—31 rising upwardly from the transverse brace bars 16—16. The bar 30 is disposed centrally of the chassis and extends parallel to the side bars 12—12 thereof. The bar 30 is of a length to extend forwardly and rearwardly beyond the axles 28—28. Fixedly carried by the bar 30 for locking engagement beneath the axles 28—28 are locking plates 32—32. Sliding movement is imparted to the bar 30 by means of a rod 33 journalled in bearings 34 fixed to the right rail 18 of the handle 17. The lower end of the rod 33 is formed with an inwardly extending horizontal angular arm 34' which freely passes through an elongated slot 35 provided in the rear end of the slide bar 30. The upper end of the rod 33 terminates in a rearwardly extending angular handle 36. By turning the handle 36 inwardly toward the left, the arm 34 will swing forwardly causing the slide bar 30 to move forwardly a distance to cause the locking plates 32—32 to clear the axles 28—28 whereupon the wheel units A and B are free to enable movement of the same to lowered and raised position. The locking plates may be moved to their locking position by turning the handle 36 to the right which causes the bar 30 to slide in a rearward direction.

The wheel unit locking and releasing mechanism also functions to raise and lower front and rear auxiliary wheel units C and D. The auxiliary wheel units C and D are identical in construction so that a description of one will suffice for the other.

Each auxiliary wheel unit comprises a bracket 37 fixed to and extending rearwardly from the transverse brace bar 16, the extending portion of the bracket being directly beneath the slide bar 30. Pivoted at 38 to the bracket 37 is a rock arm 39, the lower end of which has a roller or wheel 40 journalled therein. The upper end of the rock arm 39 is provided with an inwardly extending slot 41 which receives a round pin 42 carried by and extending beyond opposite sides of the slide bar 30. By reason of the pin and slot connections between the rock arms 39—39 and the slide bar 30, it will be understood that upon forward sliding movement of the bar 30 to release the locking plates 32—32, the rock arms 39—39 will be rocked about their pivots 38 to cause the wheels 40—40 to move down into rolling contact with the sidewalk over which the wheels 29 of the raised wheel units A and B are also in rolling contact. Upon actuation of the bar 30 in a rearward direction to locking position, the same will impart upward rocking movements to the wheel ends of the rock levers 39—39 to cause retraction of the same from engagement with the ground or sidewalk. It will be noted that the auxiliary wheel units C and D respectively trail the ground contacting portions of the wheels 29 of the wheel units A and B.

In practice, and under normal propulsion of the vehicle 10 by one pushing upon the hand grip 19, the wheel units A and B, and auxiliary units C and D are in retracted or raised position as illustrated in full lines in Figures 1, 2, 3 and 4. Assume that a street crossing is reached and it is desirous to successively push the vehicle from a sidewalk, down a curb to a lower street level, across the street, up the curb at the other side of the street to the higher level of a sidewalk. Upon reaching the curb to be descended, the operator turns the handle 36 inwardly to the left which actuates the wheel locking mechanism to releasing position and simultaneously causes the auxiliary wheel units C and D to swing down until the wheels 40 contact the sidewalk. As the front wheels 29 of the wheel unit A clear the curb E the wheels of said unit will swing downwardly and forwardly due to the toggle connection between the axle and the chassis. To initially operate the toggle wheel carriers, each link 22 is urged rearwardly by a coil spring 43 which is mounted on the pivot pin 21 with one end fixed to the bracket 20 and its other end connected to the link 22. As the wheels 29 of the front unit drop by gravity, the links 22 and 25 move to position shown in Figure 6, whereupon the pivots 24 have moved past the center of the fixed pins 27, and which pins are at the upper ends of the slots 26. The toggles associated with the front wheels are now locked against any further movement and the weight of the body 14 and chassis 11 at the front end of the vehicle is supported by the toggle links 22—25 and pins 27. The wheels of the front unit A have now cleared the curb E and are now resting upon the lower level or street F. During the downward movement of the wheels of the front unit A, the wheel 40 of the auxiliary wheel unit C is supporting the front end of the vehicle to maintain the horizontal position of the body 11. Continued forward movement of the vehicle will cause the wheels 29 of the rear wheel unit B to reach the curb E and like the wheels of the unit A, they too will swing down to lowered position into contact with the street F. During this further forward movement, the wheel 40 of the front auxiliary unit C has cleared the curb E. As the wheels of unit B are swinging down to the level of the street F, the wheel 40 of auxiliary unit D is in contact with the higher level of the sidewalk, thus acting to hold the rear end of the body in horizontal position. The vehicle with both wheel units A and B in lowered position as shown in Figure 7 is pushed to the opposite curb G. As the wheels 29 of the front unit A strike the curb G, the wheels of the unit will swing upward to its original retracted position as shown in Figure 8. The force of the contact of the wheels of unit A with the curb causes the toggle links to swing upward to a position where the pivots 24 are forward of the pins 27. After the front wheels 29 of unit A reach the level of the sidewalk H, the roller 40 of unit C rides onto the sidewalk, but at this stage it serves no purpose. Following the retraction of the wheels of the unit A, (Figure 8) the wheels 29 of unit B strike the curb, and like the wheels of unit A, they also move up to retracted position, ride over the curb G onto the sidewalk H (Figure 9). After the wheels 29 of the rear unit B have reached the higher level, the operator turns the handle 36 to the right which causes the bar 30 to slide rearwardly to position the locking plates 32—32 beneath the axles 28—28, whereupon the wheel units are locked. Simultaneously with the locking of the units A and B in their raised or retracted position, the rearward sliding movement of the bar 30 causes the auxiliary wheel units C and D to be rocked out of contact with the ground to the position shown in Figures 1 and 4.

While I have shown and described what I consider to be the preferred embodiment of my invention I wish it to be understood that such changes in construction and design as come within the scope of the appended claims may be resorted to if desired without departing from the spirit of my invention.

I claim:

1. In a wheel vehicle having a chassis, front and rear sets of wheels, means on said chassis for supporting said sets of wheels for movement to raised and lowered positions, manually actuated means for locking said sets of wheels in raised position and for releasing the same for movement to lowered position, auxiliary wheels respectively aft of the front and rear sets of wheels, means for mounting the auxiliary wheels on said chassis for downward movement into engagement with the ground when the front and rear wheels are respectively moving from a raised position to a lowered position when the vehicle is descending a curb and when the vehicle is subsequently ascending a curb, and means operable by the manually actuated means for lowering the auxiliary wheels upon actuation thereof to release the front and rear sets of wheels and for raising said auxiliary wheels upon actuation of the manually actuated means to wheel locking position.

2. In a wheel vehicle having a chassis, front and rear sets of wheels, individual means connecting each set of wheels to said chassis for movement of the wheels to raised and lowered positions, each individual means including an axle on which the set of wheels is mounted, link actuating mechanisms at opposed sides of the chassis, each link actuating mechanism comprising a pair of pivotally connected links, one of said links being pivoted to the chassis, the free end of the other link being connected to the axle, said last mentioned link having a slot therein, a fixed pin carried by the chassis rearward of the pivotal connection between the first mentioned link and the chassis, the pivotal axis between the links adapted to pass from one side thereof to the other during movement of the set of wheels to and from raised and lowered positions, releasable locking means engageable with the axles of the sets of wheels when in raised position, and manually operable means for actuating the releasable locking means to locking and releasing positions.

3. In a wheel vehicle having a chassis, front and rear sets of wheels, and individual means connecting each set of wheels to said chassis for movement of the wheels to raised and lowered positions, each individual means including an axle on which the set of wheels is mounted, toggle actuating mechanisms associated with the ends of each axle, each toggle actuating mechanism comprising a pair of pivotally connected links, one of said links being pivoted to the chassis, the free end of the other of the links being connected to the axle, a pin and slot connection between the last-named link and the chassis which is offset relative to the pivotal connection between the first-mentioned link and the chassis, the pivotal axis between the links adapted to pass from one side thereof to the other during movement of the set of wheels to and from raised and lowered position.

4. In a wheel vehicle as set forth in claim 3 including manually operable means for locking each set of wheels in raised position.

5. In a wheel vehicle as set forth in claim 3 including releasable locking means engageable with the axles of the respective sets of wheels when in raised position.

6. In a wheel vehicle as set forth in claim 3, in combination, front and rear auxiliary wheels respectively aft of the front and rear sets of wheels and disposed centrally of the chassis, means for mounting the auxiliary wheels on said chassis for downward movement into engagement with the ground when the front and rear wheels are respectively moving from a raised position to a lowered position when the vehicle is descending a curb and when the vehicle is subsequently ascending a curb, and means operable by the manually operable means for lowering the auxiliary wheels upon actuation thereof to actuate the releasable locking means to releasing position and for raising the auxiliary wheels upon actuation of the manually operable means to effect actuation of the releasable locking means to locking position.

HENRY TANNENBAUM.